United States Patent [19]
Korth

[11] 4,441,784
[45] Apr. 10, 1984

[54] PARABOLOIDAL COUPLER FOR LIGHT WAVE GUIDES

[75] Inventor: Hans-Erdmann Korth, Stuttgart, Fed. Rep. of Germany

[73] Assignee: International Business Machines Corp., Armonk, N.Y.

[21] Appl. No.: 258,868

[22] Filed: Apr. 30, 1981

[30] Foreign Application Priority Data

May 24, 1980 [DE] Fed. Rep. of Germany ....... 3019955

[51] Int. Cl.³ .............................................. G02B 7/26
[52] U.S. Cl. ............................ 350/96.15; 350/96.16; 356/345
[58] Field of Search ................ 350/96.15, 96.16, 96.18; 250/227; 356/345, 351

[56] References Cited
U.S. PATENT DOCUMENTS

| | | | |
|---|---|---|---|
| 3,886,544 | 5/1975 | Narodny | 350/96.15 X |
| 4,021,099 | 5/1977 | Kawasaki et al. | 350/96.18 X |
| 4,185,885 | 1/1980 | Chown et al. | 350/96.18 |
| 4,211,469 | 7/1980 | Holzman | 350/96.16 |
| 4,246,475 | 1/1981 | Altman | 350/96.15 X |
| 4,274,705 | 6/1981 | Miller | 350/96.15 |
| 4,342,517 | 8/1982 | Johnson et al. | 356/351 X |

FOREIGN PATENT DOCUMENTS

25586 3/1981 European Pat. Off. ......... 350/96.15

OTHER PUBLICATIONS

Bickel et al., "Bidirectional Coupler for Full Duplex Transmission . . . ", *Proc. of S.P.I.E.*, vol. 139, *Guided Wave Opt. Systs. & Dev.*, Mar. 1978, pp. 63–69.
Bealle, "Parabolic Coupler for Fibre Optics," *IBM Tech. Discl. Bull.*, vol. 23, No. 3, Aug. 1980, p. 978.

*Primary Examiner*—John D. Lee
*Attorney, Agent, or Firm*—Gerald R. Woods

[57] ABSTRACT

A self-focussing coupler for optical fibers includes a transparent body having the configuration of a paraboloid of revolution. One or more optical fibers are connected to the body at or near the point of focus. A flat face is formed at a normal to the axis of symmetry. A coupler assembly is formed by bringing the faces of two couplers together. Different optical components (beam splitting plates, bandpass filters, etc.) may be placed in an interface gap and bypass fibers may be added to alter the functions of the coupler assembly.

10 Claims, 8 Drawing Figures

PARABOLOIDAL COUPLER FOR LIGHT WAVE GUIDES

TECHNICAL FIELD

The invention relates to optical systems and more particularly to a coupler for light wave guides.

BACKGROUND ART

Optical data transmission using light wave guides (optical fibers) has become increasingly important because of high transmission capacity, low attenuation rates and decreasing fiber costs. For producing a complete transmission system, it is necessary to provide pluggable couplers, so-called optical plugs, which when used will not significantly degrade the optical quality of the transmission line and will not introduce significant attenuation.

At the very small geometrical dimensions of the light wave guides, ranging from several $\mu$ (in the case of so-called monomode fibers) to a maximum of $100\mu$ (in the case of multi-mode fibers), the coupling of two fibers has required extreme mechanical accuracy in the plug dimensions. Proposals known from the art for making optical plugs (see, for example, the article by M. Kaiser in Elektronik 1979, Vol. 8, page 90) are based on the principle of mutual alignment of the fiber ends, using highly accurate and thus expensive precision means.

A second approach proposed for solving this problem consists in providing an optical imaging system between the two fibers to be connected. Examples of such a system may be seen from Deutsche Offenlegungsschriften 29 05 360 and 25 46 861. Because of the high accuracy requirements, such imaging systems are also elaborate, expensive and difficult to align.

Finally, for by-passing the mutual alignment of very small dimensions, it has been proposed to provide the fibers to be connected with thickened end pieces, thus obtaining larger stop faces which are less difficult to align. An example of such optical plugs is specified in U.S. Pat. Ser. No. 3,944,327. To permit light propagation in the thickened end pieces to proceed unhampered, the refractive index profile in these end pieces must be of a particular (e.g., parabolic) shape. Although this is possible in principle, using, for example, ion implantation, the manufacturing expenditure is considerable.

SUMMARY

Therefore, it is an object of the present invention to provide a pluggable coupler for light wave guides, which is easy to make and use while offering maximum optical quality.

An optical plug made in accordance with the invention includes a transparent paraboloid of revolution, serving as a coupler, provided at each fiber end. The paraboloid of revolution has an optically flat surface perpendicular to the axis of symmetry, and the fiber is connected at or near the point of focus. For optical coupling, the flat surface of one paraboloid of revolution is placed in contact with the flat surface of another paraboloid.

The light applied at or near the focus of the paraboloid diverges and is converted into a parallel beam by total reflection. The flat surfaces or faces of the paraboloids are very large in comparison to the optical fibers, permitting easy alignment. The critical step of connecting the fiber to the paraboloid is performed during manufacture and thus can be very accurately controlled. Optical plugs of the type described have very low optical losses and are generally insensitive to dust. A change in the mode distribution, which is detrimental in some transmission modes, is eliminated.

A further significant advantage of this plug is that additional optical elements can be easily introduced between the faces of the paraboloids of revolution. Thus, the plug function is extended from a simple connecting element to a complex, multi-purpose optical element for transmission systems with light wave guides. Examples of components which may be additionally introduced are interference filters permitting a frequency-dependent coupling in and out of light, beam splitters with an arbitrarily selectable splitting ratio, wavelength-dependent couplers with arbitrarily adjustable transfer functions, etc.

BRIEF DESCRIPTION OF THE DRAWINGS

A preferred embodiment of the invention will be described in detail below with reference to drawings wherein.

BEST MODE FOR CARRYING OUT THE INVENTION

Figure 1:
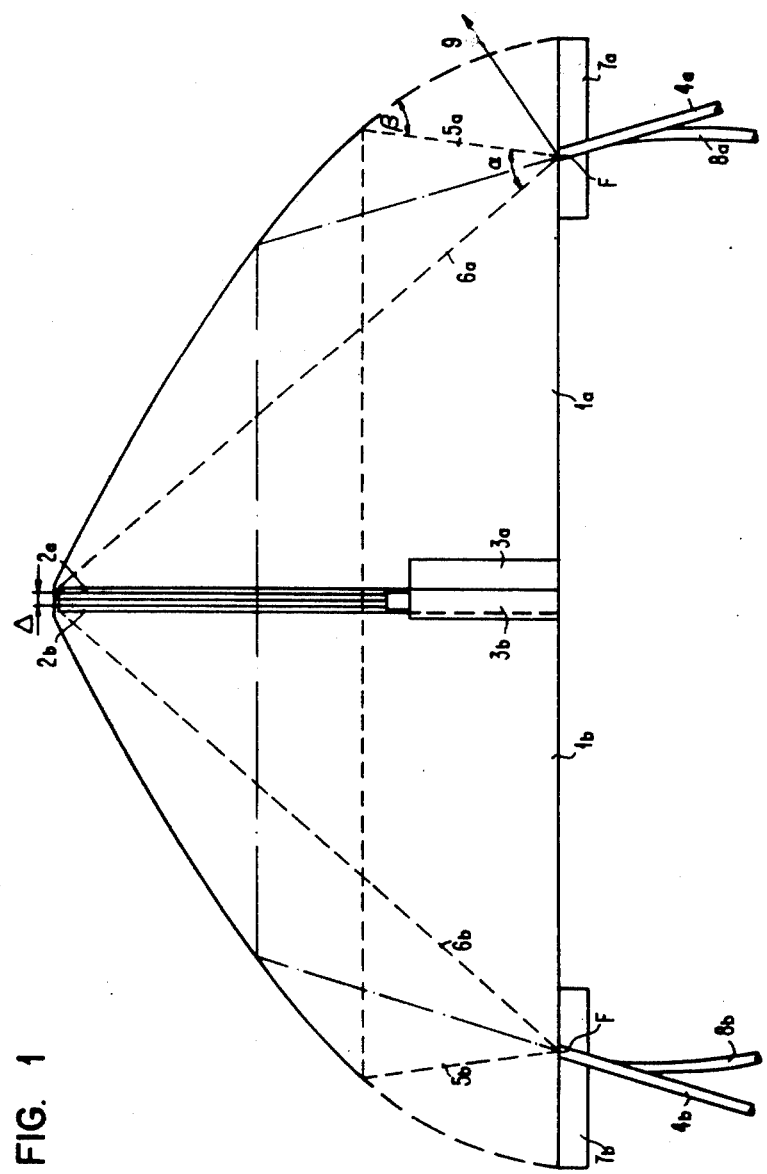
FIG. 1 is a front view of an optical plug consisting of two symmetrical parts in the connected state.
Figure 2:
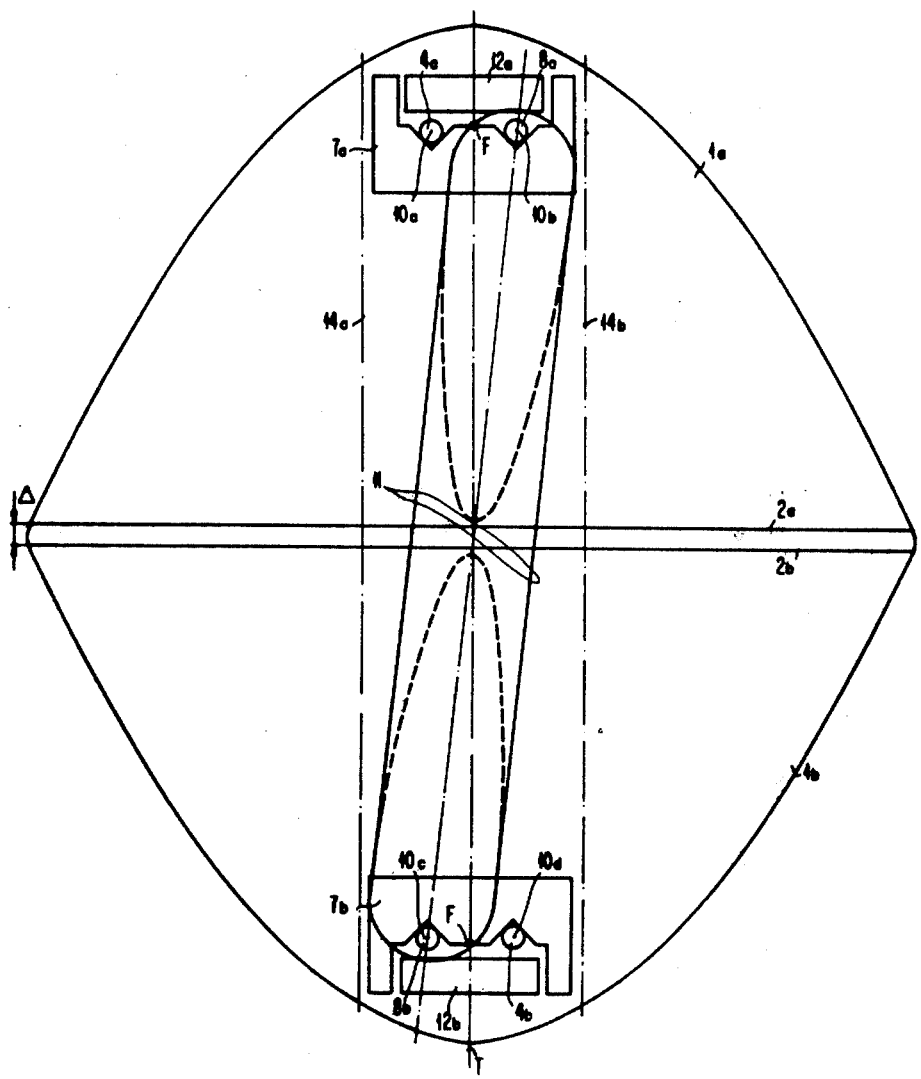
FIG. 2 is a top (plan) view of the connected plug of FIG. 1.

The basic design of a paraboloid coupler is shown in the connected state in side and top view, respectively, in FIGS. 1 and 2. Identical reference numbers in the figures denote identical elements.

The units 1a and 1b of the paraboloid coupler are paraboloids of revolution made of a transparent material (e.g., glass or plastic). The paraboloids are cut perpendicularly to their axis of symmetry so as to have sectional faces 2a, 2b adjacent each other. These sectional faces have a high optical quality. They may be in direct contact or be positioned parallel to each other at a spacing $\Delta$. In the latter case, the two paraboloids have precisely machined stops 3a, 3b for maintaining the parallelism of the sectional faces.

After the optical plugs have been connected, the space $\Delta$ may remain empty or may be filled with an immersion liquid or further optical components, the functions of which will be described further on.

Optical fibers 4a, 4b are to be optically connected. Fibers 8a, 8b are similarly to be optically connected. All of these fibers are secured at suitable apertures either at the focus F of the respective paraboloid or at a point in its immediate vicinity.

In the simplest embodiment of the optical plug only one optical fiber 4a, 4b is directly connected at focus F of each paraboloid. If light from fiber 4a is to be coupled to fiber 4b, the conditions are as follows: The light exiting from fiber 4a at an aperture angle $\alpha$ is totally reflected at the surface of the paraboloid of revolution to form a parallel beam which is transmitted through the sectional faces of the two paraboloids along a normal. This parallel beam is again totally reflected at the second paraboloid 1b. The reflected light is collected at the focus F of the second paraboloid; i.e., the point of attachment for exit fiber 4b.

The effective fiber aperture $\alpha$ is determined by the two marginal rays 5 and 6; ray 5 is determined by the critical angle $\beta$ of the total reflection, whereas ray 6 is determined by the geometry of the paraboloid. Rays extending outside the effective aperture cone (e.g., ray 9) are lost. In this manner, spurious modes can be easily coupled out.

In a preferred embodiment the ends of the optical fiber are not directly connected to the focus F of the respective paraboloid of revolution but at spaced points arranged symmetrically to the axis of revolution. These points are designated as 10a to 10d in FIG. 2. If, for example, two individual optical fibers 4a, 4b are to be coupled to each other, one fiber may be connected to point 10a, while the other is connected to point 10d; in accordance with this, fiber 8a may be introduced at point 10b, whereas fiber 8b may be secured at point 10c.

FIG. 2 is a schematic of the beam 11 of an optical connection between points 10b and 10c. The distorted ellipses marked by broken lines represent the points of incidence of the aperture cones on the face of the paraboloid of revolution. The peripheral areas of the paraboloid (e.g., outside the dash-dotted straight line (14a, 14b) are not touched by the beam path and thus may be omitted in practice.

The use of two symmetrical connecting points in each paraboloid of revolution permits a plurality of operating modes for the coupler; as a result, it is possible in particular to operate the two halves of the coupler separately. For this purpose, the sectional face (or the space $\Delta$) may be provided with a mirror, so that the light emanating from point 10a is imaged on to point 10b. If all four symmetrical connecting points are used for optical fibers, a plurality of coupling facilities results between the entries and exits to be defined in each case, depending upon how the light is applied and upon the characteristics of the optical elements used in the space $\Delta$. Details of different arrangements will be explained below by means of FIGS. 3–8.

Where fiber connecting points are symmetrical to the axis of revolution, care must be taken that the fiber ends are located in a common plane. For accurately fixing the fiber ends, it is possible to use, for example, V-shaped recesses in a retainer 7, into which the fiber ends are inserted and in which they are retained by a counterpiece 12. FIG. 2 shows a top view of this arrangement. Each half of the paraboloid coupler described herein may be manufactured as a monolithic optical component; the end of the optical fiber is cast in the transparent paraboloid block; prior to this, the fiber is aligned in a simple manner by centering the light reflected at the reference face 2 on to the second symmetrically arranged connecting point. In this simple manner, single mode fibers with a very small diameter can also be easily centered under factory conditions.

FIGS. 3–8 show different versions of the paraboloid coupler circuit, using different additional optical components in the space $\Delta$. These function diagrams are schematic top views. The connecting points designated as 10a–d in FIG. 2 are designated as I–IV in FIGS. 3–8. A beam path within the plug is marked by thin lines with directional arrows. The respective optical fibers are represented by thin tubes. The incident light is applied via fiber 20, the exit fibers being designated as 21.

Figure 3:
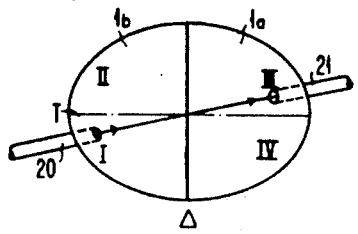
FIG. 3 is a functional top view of an optical plug made in accordance with the invention.

FIG. 3 shows the use of the two paraboloids of revolution as a simple disconnectable plug. The fibers 20, 21 to be optically connected to each other are linked up at the connection points I and III which are arranged in different halves of the plug on either side of the symmetry axis T. The sectional face between the two paraboloids is marked by a solid line.

Figure 4:
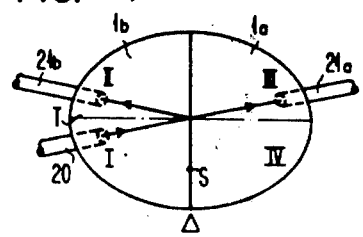
FIG. 4 is a functional diagram of an optical plug adapted for use as a beam splitter.

In FIG. 4 a beam splitter designated as S (for example, a suitable coated glass plate) is arranged in space $\Delta$. By means of this beam splitter, the light applied to connecting point I can be distributed to the exit II in the same paraboloid 1b and to exit III in the other paraboloid 1a and thus to the fibers 21b, 21a, respectively. The splitting ratio is determined by the characteristics of the beam splitter and may be varied over a wide range. If coupling of energy to fiber 21a is not required, a totally reflecting mirror can be used which permits the light incident at connecting point I to be directed without losses to connecting point II. This function may be advantageous, for example, if the second plug half is not connected.

Figure 5:
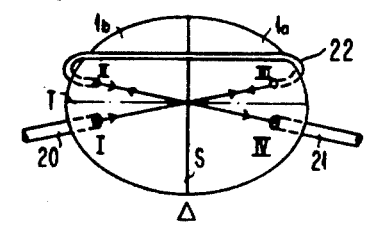
FIG. 5 is a functional diagram of the optical plug adapted for use as a ring interferometer.

FIG. 5 shows a different embodiment of a beam splitter. Optical energy passed by beam splitter S is fed from exit III in paraboloid 1a back to connecting point II of the other paraboloid 1b via an external fiber 22. In the feedback branch, the portions of light reflected at and passed by beam splitter S interfere with each other. The interference radiation passes the beam splitter S and can be tapped at connecting point IV of the paraboloid 1a. This arrangement constitutes a ring (Sagnac) interferometer.

Figure 6:
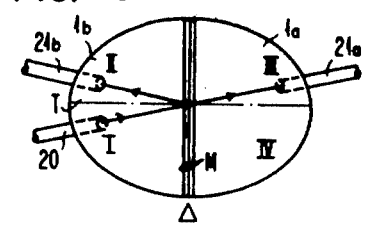
FIG. 6 is a functional diagram of the optical plug including an interposed multi-layer interference filter which adapts it for use as a color coupler.

FIG. 6 shows a color coupler which is obtained by introducing an optical filter M with selective transmission (and selective reflection, respectively) into the space between the two paraboloids. Thus, a narrow-band segment of the wide-band light applied to entry I can be tapped in the fibers 21a, 21b at the exit III and II respectively. Such an optical bandfilter can be produced as a separate plate by subdividing a (known) multi-layer interference filter and can be introduced into the paraboloid coupler, if required. In this manner, color couplers with identical filters can be produced.

Figure 7:
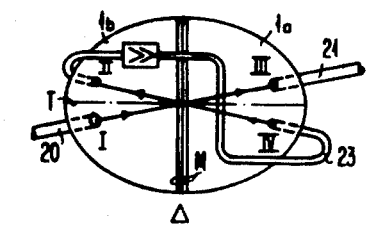
FIG. 7 is a functional diagram of the optical plug including an interposed multi-layer interference filter and adapted for use as a single-channel repeat amplifier.

FIG. 7 shows a narrow-band optical single channel repeat amplifier; the space $\Delta$ between the paraboloids again contains a narrow-band optical filter M which reflects only a very limited part of the spectrum. This reflected energy is directed via an optical fiber into an amplifier. The amplified signal is fed through an external fiber 23 to connection IV in paraboloid 1a. After reflection from the right side of filter M, the amplified single-channel signal is recombined with the other frequencies originally passed by filter M to exit III.

Figure 8:
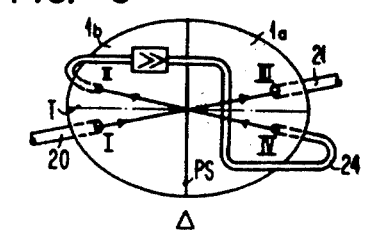
FIG. 8 is a functional diagram of the optical plug with an interposed polarizing beam splitter permitting it to be used as a fail safe refresh amplifier.

FIG. 8 is a schematic of a fail safe optical refresh amplifier. A polarizing beam splitter PS is introduced between the paraboloids. The polarized beam reflected at this beam splitter is coupled out to an external fiber 24 at connecting point II and amplified before re-entering paraboloid 1A at connecting point IV. Upon reflection from the right side of beam splitter PS, the amplified light is imaged onto its connecting point III, forming the output signal together with the optical energy which was originally passed directly through beam splitter PS. If the amplifier fails, the optical energy which passes directly from connecting point I to connecting point III is in any case maintained as an output signal.

Such couplers can be used for complex communication systems, such as those described, for example, in the simultaneously filed U.S. Pat. application Ser. No. 258,990.

Having thus described my invention with reference to a preferred embodiment thereof, what I desire to protect by Letters Patent is:

1. A coupler assembly comprising a pair of couplers, each of said couplers including a light transmitting body having the configuration of a paraboloid of revolution, said body having a flat face perpendicular to an axis of symmetry and a connection for at least one optical fiber at or near its point of focus, said couplers being arranged with their respective flat faces in adjacent, parallel relationship.

2. A coupler assembly as defined in claim 1 wherein the body of each coupler in the assembly has connections for a pair of optical fibers at points equidistant from the axis of symmetry.

3. A coupler assembly as recited in claim 1 wherein the body of each coupler includes projecting stops at said flat face for allowing a substantial portion of each face to be relatively recessed.

4. A coupler assembly comprising a pair of couplers as recited in claim 3 arranged with their projecting stops in contact, whereby the flat faces are maintained parallel to but spaced from one another to form an inter-face gap.

5. A coupler assembly as recited in claim 4 wherein the inter-face gap is filled with a liquid having an index of refraction matching the index of refraction of said light transmitting bodies.

6. A coupler assembly as recited in claim 4 further including a beam splitting element located in the inter-face gap, said element being capable of delivering a first portion of the optical energy applied through an entry fiber to a first exit fiber located in the same body and a second portion to a second exit fiber located in the other body.

7. A coupler assembly as recited in claim 4 configured as a ring interferometer and having a beam splitting element located in the inter-face gap and an external optical fiber extending between a connection to one light-transmitting body and a connection to the other light-transmitting body.

8. A coupler assembly as recited in claim 4 further including an optical bandfilter located in the inter-face gap, an entry fiber connected to one light transmitting body for introducing a broad band optical signal into that body and an exit fiber connected to the other light-transmitting body for collecting a narrow band optical signal passed by said optical band filter into that other body.

9. A coupler assembly as recited in claim 4 further including an optical bandfilter located in the inter-face gap, an entry fiber connected to one light-transmitting body for introducing an optical signal into that body, an optical bypass circuit connected between said one body and the other body, said bypass circuit including an optical amplifier for accepting optical signals reflected by said bandfilter and for applying an amplified form of those signals to said other body, and an exit fiber connected to said other body for collecting the unamplified signals passed by said bandfilter and the amplified signals provided through said bypass circuit.

10. A coupler assembly as recited in claim 4 further including a polarizing beam splitter located in the inter-face gap, an entry fiber connected to one light-transmitting body for introducing an optical signal into that body, an optical bypass circuit connected between said one body and the other body, said bypass circuit including an optical amplifier for accepting optical signals reflected by said beam splitter and for applying an amplified form of those signals to said other body, and an exit fiber connected to said other body for collecting the unamplified signals passed by said beam splitter and the amplified signals provided through said bypass circuit.

* * * * *